United States Patent
Sato et al.

(10) Patent No.: US 7,104,050 B2
(45) Date of Patent: Sep. 12, 2006

(54) CONTROL METHOD FOR AN EXHAUST GAS PURIFICATION SYSTEM AND AN EXHAUST GAS PURIFICATION SYSTEM

(75) Inventors: Hitoshi Sato, Fujisawa (JP); Tatsuo Mashiko, Fujisawa (JP); Takao Onodera, Fujisawa (JP); Atsushi Matsunuma, Fujisawa (JP); Takashi Haseyama, Fujisawa (JP); Wei Wu, Fujisawa (JP); Takuro Iwashita, Fujisawa (JP); Shigeru Ikeda, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/078,493

(22) Filed: Mar. 14, 2005

(65) Prior Publication Data

US 2005/0217252 A1 Oct. 6, 2005

(30) Foreign Application Priority Data

Mar. 31, 2004 (JP) ............................. 2004-101903

(51) Int. Cl.
*F01N 3/00* (2006.01)

(52) U.S. Cl. ............................. 60/295; 60/287; 60/291; 60/292; 60/297; 60/311

(58) Field of Classification Search ............... 60/274, 60/277, 285, 287, 291, 292, 295, 297, 311, 60/324

See application file for complete search history.

(56) References Cited

U.S. PATENT DOCUMENTS

| | | | |
|---|---|---|---|
| 4,835,964 A * | 6/1989 | Kume et al. | 60/285 |
| 5,287,698 A * | 2/1994 | Shinzawa et al. | 60/286 |
| 6,032,461 A * | 3/2000 | Kinugasa et al. | 60/295 |
| 6,865,885 B1 * | 3/2005 | Kitahara | 60/297 |
| 7,028,466 B1 * | 4/2006 | Kondou et al. | 60/295 |

FOREIGN PATENT DOCUMENTS

| | | |
|---|---|---|
| EP | 1 195 508 | 4/2002 |
| JP | 04086319 | 7/1990 |
| JP | 2002-276340 | 9/2002 |
| JP | 2003-155914 | 5/2003 |

(Continued)

OTHER PUBLICATIONS

European Search Report for corresponding application EP05 10 2133 dated Jul. 22, 2005.

*Primary Examiner*—Binh Q. Tran
(74) *Attorney, Agent, or Firm*—Staas & Halsey LLP

(57) ABSTRACT

A method and system providing a vehicle condition detection means (38C) for detecting the stopped and traveling state of a vehicle, and when the vehicle condition detection means (38C) detects that the vehicle has stopped during operation of an exhaust gas temperature raising means (35IC), closing an exhaust gas throttling valve (16) in addition to continuing the operation of the exhaust gas temperature raising means (35IC), and subsequently, when the vehicle's traveling state is detected, opening the exhaust gas throttling valve (16) and continuing the operation of the exhaust gas temperature raising means (35IC). Accordingly, in terms of the regeneration of a continuous regeneration-type DPF device (13) capable of significantly reducing the frequency with which the driver is urged to stop the vehicle and perform forced regeneration, the exhaust gas can be efficiently maintained at a high temperature, and reliable burning of PM is possible even for driving patterns featuring frequent waiting at traffic signals in urban areas, even upon transition to the stationary idling condition during automatic traveling regeneration.

5 Claims, 6 Drawing Sheets

FOREIGN PATENT DOCUMENTS

| | | |
|---|---|---|
| JP | 2003155914 | 5/2003 |
| JP | 2004353529 | 5/2003 |
| JP | 2003-206723 | 7/2003 |

* cited by examiner

CONTROL METHOD FOR AN EXHAUST GAS PURIFICATION SYSTEM AND AN EXHAUST GAS PURIFICATION SYSTEM

BACKGROUND OF THE INVENTION

The present invention relates to an exhaust gas purification system that purifies particulate matters (PM) from the exhaust gas discharged by diesel and other internal combustion engines using a continuous regeneration-type diesel particulate filter (DPF) and also to a control method thereof.

In the same way as for NOx, CO, and also HC etc., restrictions on the volume of particulate matters (hereinafter "PM") discharged from diesel internal combustion engines grow severe every year. Techniques for collecting this PM in a filter known as a diesel particulate filter (hereinafter "DPF") and for reducing the quantity thereof by discharging externally have been developed. Continuous regeneration DPF devices represent such.

However, even in continuous regeneration DPF devices, increasing exhaust gas pressure as a result of filter clogging has become a problem. In other words, although the PM collected by these continuous regeneration DPF devices is continuously burned and purified, and the filter will self-regenerate while the exhaust gas temperature is approximately 350° C. or greater, when the exhaust gas temperature is low or the traveling condition of an internal combustion engine has a low NO discharge—for example, when an internal combustion engine has a continuously low exhaust gas temperature accompanied by idling or low load/low speed traveling, etc.—the temperature of the exhaust gas drops and the catalyst becomes inactive as a result of the low temperature thereof. Accordingly, as the oxidization reaction does not progress and NO becomes insufficient, the above-described reaction does not take place, and the filter does not regenerate by oxidizing the PM. Accordingly, the accumulation of PM in the filter continues and clogging thereof is accelerated.

Countermeasures for clogging of the filter such as those described below are disclosed in Japanese patent application Kokai publications No. 2002-276340 and No. 2003-206723. Before clogging of the filter has exceeded a predetermined level using methods for detecting the differential pressure before and behind the filter etc. has been detected, if the exhaust gas temperature is lower than the active temperature of the oxidation catalyst provided upstream of the filter or the oxidation filter supported on the catalyst, exhaust gas temperature is forcibly raised and the collected PM then forcibly removed through being burned.

Furthermore, injection control within the cylinders can be used as a means for raising the exhaust gas temperature. In accordance with this method, multi-step injection is carried out and the exhaust gas temperature is raised; post injection is carried out when the temperature thereof has risen beyond the active temperature of the oxidation catalyst; and any unburned fuel contained in the exhaust gas is burned in the oxidation catalyst. As a result of this burning, the exhaust gas temperature is raised beyond the temperature of burning temperature of the PM collected in the filter, and the collected PM removed through the burning thereof, thus regenerating the filter.

Normally with continuous regeneration DPF devices, when the collected quantity of PM reaches a preset limit, the traveling condition of the internal combustion engine is automatically changed to regeneration mode. In this forced regeneration mode operation, the exhaust gas temperature is forcibly raised and the quantity of NOx is increased. And thereby, the collected PM is oxidized and removed from the filter to regenerate the filter.

Furthermore, Japanese patent application Kokai publication No. 2003-155914 proposes an operating means whereby, an actuation means such as a forced regeneration means which can be actuated arbitrarily when a large quantity of particulate matters (PM) has accumulated in the diesel particulate filter (DPF) by some reasons, the driver can intentionally and immediately carry out the forced regeneration of the particulate filter. More specifically, this actuation means is comprised of a warning light that indicates excessive collecting condition and a regeneration button in the vicinity of the driver's seat so that forced regeneration can be arbitrarily controlled.

Furthermore, Japanese patent application Kokai publication No. 2003-155914 proposes to indicate a warning to carry out a human-initiated forced regeneration in which the collected particulate matters are forcibly burned and removed when it is judged that the particulate filter has become clogged upon a confirmation of an abnormal increase in back pressure based on the differential pressure before and behind the particulate filter.

In order to address the problem of oil dilution upon forced regeneration while traveling and the problem of uneven accumulating around the outer surface of the PM filter, a regeneration control method comprised of a combination of manual regeneration and traveling automatic regeneration in response to a travel distance is under consideration.

In terms of oil dilution, it is undesirable that forced regenerating processing be too frequently carried out. If forced regenerating processing is carried out while the vehicle is being traveled, the engine speed will be high in comparison with that of stationary idling; accordingly, it is inevitable that post injection volume increases with a result that the degree of diluting of oil by fuel increases. In particular, a post injection control becomes difficult during transient condition. In other words, even if the engine temperature is raised in a transient condition resulting from load variation, post injection is performed wastefully. It is difficult to avoid this type of wasteful injection. And furthermore, if left unaddressed, oil dilution can lead to the problems of excessive wear or scorching of the moving mechanical components.

In contrast, the forced regeneration control does not cause such problems in a stationary condition of the vehicle and the degree of oil dilution relatively insignificant. As a result, the forced regeneration control is not carried out while the vehicle is being traveled, but after it has stopped traveling.

In other words, when the operating condition is in a stabilized mode such as an idling condition while the vehicle is stationary, the post injection of fuel injection into the cylinder is carried out with an injection quantity corresponding to a load less than that necessary for normal vehicle traveling. As a result, forced regeneration is carried out by raising of the exhaust gas temperature, and oil dilution can be reduced to a level lower than that corresponding to regeneration control while the vehicle is being traveled.

One method thereof is disclosed as follows in Japanese patent application Kokai publication No. 2003-155914. When the filter reaches a preset level of clogging, the driver is notified of the need to carry out forced regeneration using a lamp or such like, and after stopping the vehicle upon receiving of this notification, the driver operates a manual regeneration switch provided in the vicinity of the driver's seat to perform forced regeneration control and filter regeneration.

Furthermore, since a vehicle has a wide range of traveling patterns, problematic clogging unrelated to differential pressure and resulting from uneven loading of PM can also occur. For example, there are many occasions on which vehicles are frequently traveled on high-speed motorways and at high-speed with high-load, and since the exhaust gas temperature is also high, forced regeneration control is not carried out and self-regeneration is urged. However, PM does not accumulate at the center of the filter, and uneven accumulating—in other words, accumulation in a circular pattern around the outside thereof—occurs. And when PM burning starts in such a case during forced regeneration carried out after uneven accumulating, this uneven PM accumulation is all burned at essentially the same time and in a rapidly expanding pattern. As a result, extremely high temperatures occur within the interior of the filter. And this runaway burn is a cause of the DPF melting.

The problem of oil dilution becomes less frequent when a sufficiently long distance is traveled as fuel mixed into the oil evaporates. Accordingly, a combination of forced regeneration by multi-step injection and post injection is adopted for forced regeneration in response to a manual regeneration switch being operated when the travel distance has exceeded a predetermined travel distance and the exhaust gas temperature is low even if the vehicle is being currently traveled.

Furthermore, in the case of vehicles often driven by low-speed/high-load traveling patterns, flashing of the lamp to notify the driver the need of manual regeneration is so frequent that the driver feels it troublesome. In order to avoid this problem, the low collecting exhaust gas temperature raising control is carried out to raise the exhaust gas temperature by temporary control of fuel injection into the cylinder without an Unburned fuel supply control by post injection—the vehicle can be traveled until it has reached the distance at which the fuel mixed into the oil evaporates and regeneration during traveling is possible.

A first temperature raising judgment collecting quantity, which is less than the judgment collecting quantity corresponding to the notification of a manual regeneration request, and a second temperature raising judgment collecting quantity, which is less than the first temperature raising judgment collecting quantity, are provided for this low collecting quantity-time exhaust gas temperature raising control. The low-collecting quantity-time exhaust gas temperature raising control operates when the detected collecting quantity has exceeded the first temperature raising judgment collecting quantity, and thereafter, it is interrupted when the detected collecting quantity has fallen below the second temperature raising judgment collecting quantity.

Nevertheless, vehicles are actually traveled in a wide range of different traveling conditions. In particular, in such a place like an urban area, traveling and stopping are frequently repeated because of traffic signals and the like. This repetition makes engine load varies between traveling condition and stationary idling condition in a complicated manner. Consequently, the exhaust gas temperature also varies in a complicated manner.

In other words, in the case low collecting quantity-time exhaust gas temperature raising control is carried out using multi injection, when engine condition changes from traveling condition to stationary idling condition, the exhaust gas temperature raised during traveling of the vehicle drops as a result of factors such as reduced flow of exhaust gas when the vehicle stops. Furthermore, since the engine load in stationary idling is low, the combustion condition upon multi injection is not stable when low collecting quantity-time exhaust gas temperature raising control continues to be active, and as a result, exhaust gas temperature raising is not possible.

For this reason, different traveling patterns can cause problems such that unburned fuel ultimately turns into white smoke to be discharged to the atmosphere and fuel efficiency deteriorates. That is to say, it is possible that DPF regenerating control will not terminate within the preset time, that it will not be possible to sufficiently raise the exhaust gas temperature, and that the collected PM will not be burned and removed sufficiently. Furthermore, since the combustion condition is not stable, not all of the injected fuel is burned within each cylinder, and in addition, since the exhaust gas temperature is low, this unburned fuel is not oxidized by the action of the oxidation catalyst and flows therefrom into exhaust duct can occur.

In addition, as the exhaust gas temperature drops while the vehicle is in the stationary idling condition, even when traveling thereof restarts, a certain period of time is required until the exhaust gas temperature is raised to where self-regeneration of the DPF is accelerated, the time required for execution of low collecting quantity-time exhaust gas temperature raising control using multi injection becomes longer, and this causes a problem of impaired fuel efficiency.

SUMMARY OF THE INVENTION

The purpose of the present invention is to provide a control method for an exhaust gas purification system and an exhaust gas purification system, in which continuous regeneration DPF devices are comprised with an automatic traveling regeneration control which performs a forced regeneration automatically during traveling and a manual regeneration control which notifies a driver a warning by a flashing of an indicator lamp etc. to stop the vehicle and to operate a manual switch for a forced regeneration, and further characterized in that even when transitioning to the stationary idling condition during low collecting quantity-time exhaust gas temperature raising control, a high exhaust gas temperature can be efficiently retained and secure burning of PM is possible even for driving patterns with frequent waiting at traffic signals in urban areas.

For achieving the above-described purpose, the control method for an exhaust gas purifying system according to the present invention is provided with a continuous regeneration DPF device and an exhaust throttle valve in the exhaust gas passage of an internal engine mounted on a vehicle; having a DPF control means including; a collected quantity detection means for detecting the quantity of collected matters in the continuous regeneration DPF device, a travel distance detection means for detecting the travel distance (distance traveled) of the vehicle, a regeneration timing judgment means for judging the regeneration start timing of the continuous regeneration DPF device, an exhaust gas temperature raising means for raising the exhaust gas temperature, an unburned fuel supply means for supplying unburned fuel in the exhaust gas, a forced regeneration means for regenerating the continuous regeneration DPF device by raising the exhaust gas temperature and forcibly burning the collected matters using the exhaust gas temperature raising means and the unburned fuel supply means, a warning means providing a warning urging a driver to stop the vehicle and operate the forced regeneration means, and a low collecting quantity-time exhaust gas temperature raising means for raising the exhaust gas temperature through control of fuel injection into the cylinder without Unburned fuel supply control; said DPF control means actuating the warning means within a manual regeneration control execution range in which the travel distance detected by the travel distance detection means is not more than a predetermined first judgment travel distance, and in addition, the quantity of collected matters detected by the PM collecting quantity detection means exceeds a predetermined judgment collecting quantity necessary for regeneration; automatically executing the forced regeneration means during traveling of the vehicle in both a first automatic traveling regeneration execution range in which a detected travel distance exceeds the predetermined first judgment travel distance and the detected quantity of collected matters exceeds the predetermined judgment collecting quantity, and a second automatic traveling regeneration execution range in which the detected travel distance exceeds a predetermined second judgment travel distance set higher than the predetermined first judgment travel distance; and actuating the low collecting quantity-time exhaust gas temperature raising means when the detected travel distance is less than the predetermined second judgment travel distance and the detected quantity of collected matters exceeds a predetermined first judgment quantity of collected matters set lower than the predetermined judgment collecting quantity, and subsequently suspending the actuation of the low collecting quantity-time exhaust gas temperature raising means when the detected quantity of collected matters is less than a predetermined second judgment quantity of collected matters set lower than the predetermined first judgment quantity of collected matters; wherein said DPF control means is provided with a vehicle condition detection means for detecting the stationary condition and the traveling condition of the vehicle; and continues the actuation of the low collecting quantity-time exhaust gas temperature raising means to close the exhaust throttle valve upon detection of stopping of the vehicle by the vehicle condition detection means during usage of the low collecting quantity-time exhaust gas temperature raising means, subsequently opens the exhaust throttle valve upon re-detection of the vehicle's traveling condition using the vehicle condition detection means, and continues the actuation of the low collecting quantity-time exhaust gas temperature raising means.

Furthermore, for achieving the above-described aim, the exhaust gas purifying system according to the present invention is provided with a continuous regeneration DPF device and an exhaust throttle valve in the exhaust gas passage thereof, having a DPF control means including; a collected quantity detection means for detecting the quantity of collected matters in the continuous regeneration DPF device, a travel distance detection means for detecting the travel distance of the vehicle, a regeneration timing judgment means for judging the regeneration start timing of the continuous regeneration DPF device, an exhaust gas temperature raising means for raising the exhaust gas temperature, an unburned fuel supply means for supplying unburned fuel in the exhaust gas, a forced regeneration means for regenerating the continuous regeneration DPF device by raising the exhaust gas temperature and forcibly burning the collected matters using the exhaust gas temperature raising means and the unburned fuel supply means, a warning means providing a warning urging a driver to stop the vehicle and actuate the forced regeneration means, and a low collecting quantity-time exhaust gas temperature raising means raising the exhaust gas temperature through control of fuel injection into the cylinder without Unburned fuel supply control; said DPF control means actuating the warning means within a manual regeneration control execution range in which the travel distance detected by the travel distance detection means is not more than a predetermined first judgment travel distance, and in addition, the quantity of collected matters detected by the PM collecting quantity detection means exceeds a predetermined judgment collecting quantity necessary for regeneration; automatically executing the forced regeneration means during traveling of the vehicle in both a first automatic traveling regeneration execution range in which a detected travel distance exceeds the predetermined first judgment travel distance and the detected quantity of collected matters exceeds the predetermined judgment collecting quantity, and a second automatic traveling regeneration execution range in which the detected travel distance exceeds a predetermined second judgment travel distance set higher than the predetermined first judgment travel distance; and actuating the low collecting quantity-time exhaust gas temperature raising means when the detected travel distance is less than the predetermined second judgment travel distance and the detected quantity of collected matters exceeds a predetermined first judgment quantity of collected matters set lower than the predetermined judgment collecting quantity, and subsequently suspending the actuation of the low collecting quantity-time exhaust gas temperature raising means when the detected quantity of collected matters is less than a predetermined second judgment quantity of collected matters set lower than the predetermined first judgment quantity of collected matters; wherein said DPF control means is provided with a vehicle condition detection means for detecting the stationary condition and traveling condition of the vehicle; and closes the exhaust throttle valve upon detection of stopping of the vehicle using the vehicle condition detection means during actuation of the low collecting quantity-time exhaust gas temperature raising means, and subsequently opens the exhaust throttle valve upon re-detection of the vehicle's traveling condition using the vehicle condition detection means, and continues the actuation of the low collecting quantity-time exhaust gas temperature raising means.

And in the above-described exhaust gas purifying system, the exhaust throttle valve is an exhaust brake valve disposed on the upstream side of said continuous regeneration DPF device.

Furthermore, the continuous regeneration DPF device of the above-described exhaust gas purification system can be realized in the form of a continuous regeneration DPF device supporting an oxidation catalyst in the filter, a continuous regeneration DPF device providing an oxidation catalyst on the upstream side of the filter, or a continuous regeneration DPF device providing an oxidation catalyst on the upstream side of the filter while also supporting a catalyst in the filter, etc.

In terms of regeneration of the continuous regeneration DPF device and in accordance with the control method for an exhaust gas purification system and the exhaust gas purification system according to the present invention, when the volume of accumulated matter is detected as being larger than the predetermined judgment collecting quantity, the driver is urged through the flashing of an indicator lamp etc. to stop the vehicle, and through the operation of a manual switch, to perform forced regeneration, and in addition, when the volume of accumulated matter has exceeded a predetermined first temperature raising judgment collecting quantity set lower than a predetermined judgment collecting quantity, low-collecting exhaust gas temperature raising is performed by multi injection in a control of fuel injection into the cylinder, the exhaust gas temperature is raised until the volume thereof becomes less than a predetermined second temperature raising judgment collecting quantity set lower than the first temperature raising judgment collecting quantity, then the PM is burned, promoting regeneration of the DPF and the following effect can be achieved.

When the vehicle is stopped at traffic signals, etc. during the execution of low collecting quantity-time exhaust gas temperature raising performing multi injection not corresponding to forced regeneration, in addition to continuing the execution of multi injection, the engine load can be increased through exhaust throttle control achieved by closing an exhaust brake or exhaust throttle; accordingly, it is possible to maintain the exhaust gas at a high temperature and efficient self-regeneration of the DPF can also be promoted when traveling is restarted.

Consequently, it is possible to burn PM securely even in traveling patterns with frequent waiting at traffic signals in urban areas, and the frequency of a manual regeneration which is required when the quantity of collecting matters reaches the predetermined judgment collecting quantity can be reduced. For this reason, the frequency of manual regeneration requests can be drastically reduced and the driver's ease of operation can be increased.

DETAILED DESCRIPTION OF THE PREFERRED EMBODIMENT

Hereinafter, the preferred embodiments of the control method for an exhaust gas purification system and the exhaust gas purification system according to the present invention will be described with reference to the accompanying drawings. The following explanation will use the example of an exhaust gas purification system provided with a continuous regeneration-type diesel particulate filter (DPF) device comprising a combination of an oxidation catalyst and a filter with a catalyst.

[Configuration of Exhaust Gas Purifying System]

Figure 1:
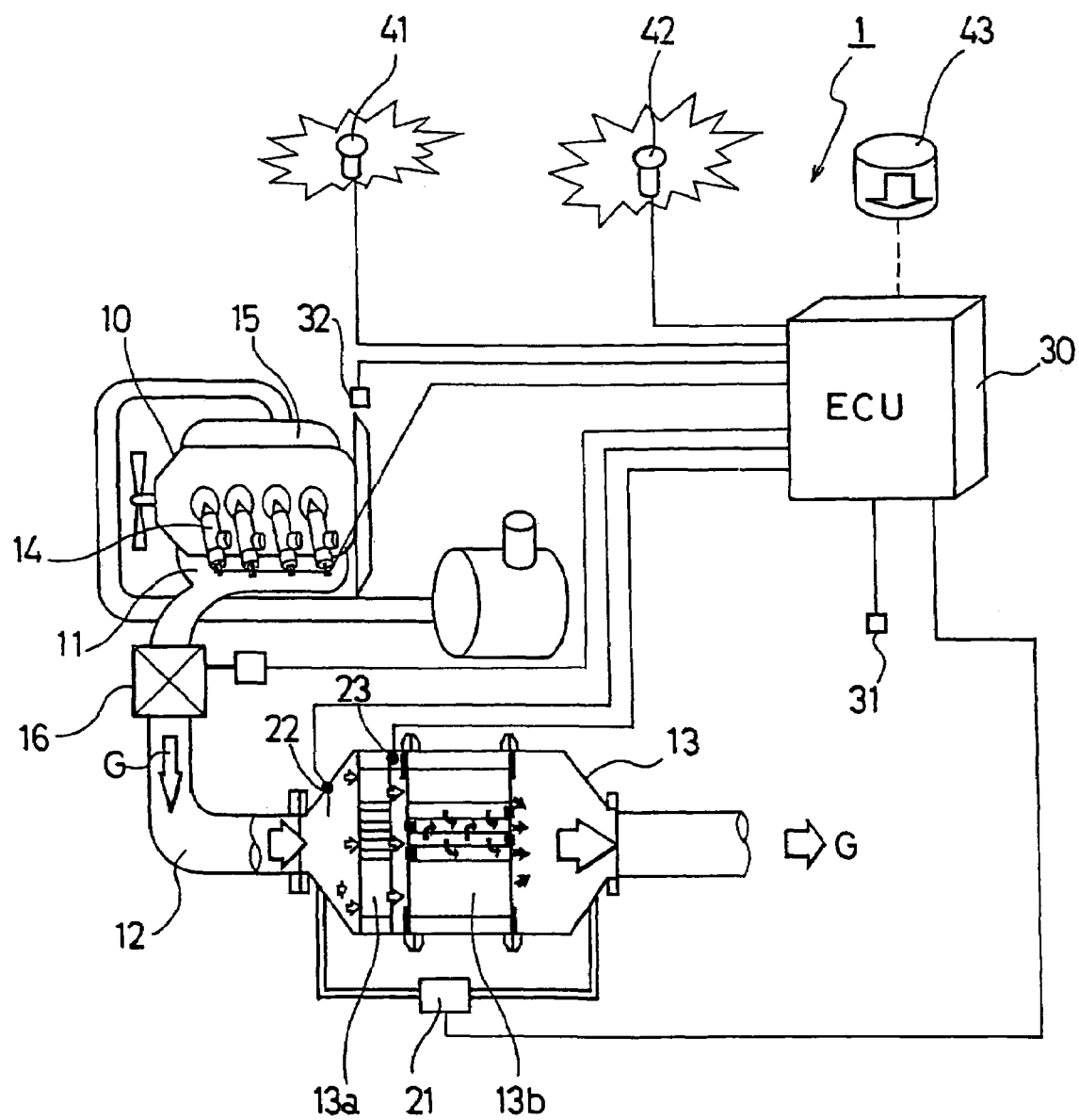
FIG. 1 is a systematic block diagram of the exhaust gas purification system according to an embodiment of the present invention.

FIG. 1 shows the configuration of an exhaust gas purification system 1 for an internal combustion engine according to an embodiment of the present invention. This exhaust gas purification system 1 is configured to provide a continuous regeneration DPF device 13 and an exhaust throttle valve 16 on an exhaust passage 12 connected to an exhaust manifold 11 of a diesel engine 10. This continuous regeneration DPF device 13 is configured with an oxidation catalyst 13a on the upstream side thereof and a filter with catalyst 13b on the downstream side thereof.

The oxidation catalyst 13a is formed so as to support an oxidation catalyst of platinum (Pt) etc. on a support with a ceramic honeycomb structure etc. The filter with catalyst 13b is formed of a monolithic honeycomb type, wall flow type filter with entrances and exits to channels in a porous ceramic honeycomb alternately closed or a felt-type filter with randomly layered alumina other inorganic fibers or the like etc. A platinum or cerium oxide etc. catalyst is supported on this filter portion.

In cases where a monolithic honeycomb type, wall flow type filter is used as the filter with catalyst 13b, the particulate matter (PM) contained in the exhaust gas is collected (trapped) in the porous ceramic walls. When a fabric type filter type is used, PM is collected in the inorganic fibers thereof.

A pressure difference sensor 21 is provided on the conduit tube in front of and behind the continuous regeneration DPF device 13 in order to estimate the collecting quantity of PM on the filter with catalyst 13b. For the purpose of regeneration control of the filter with catalyst 13b, furthermore, an oxidation catalyst inlet exhaust gas temperature sensor 22 and a filter inlet exhaust gas temperature sensor 23 are provided upstream of and between the oxidation catalyst 13a and the filter with catalyst 13b respectively.

The output values from these sensors are input to an engine control unit (ECU) 30. In addition to controlling the overall operation of the engine 10, the engine control unit 30 also performs regeneration control of the operation of the continuous regeneration DPF device 13. The fuel injection devices (i.e., injection nozzles) 14 of the engine 10 and exhaust brake or other exhaust throttle valve 16 such as an exhaust brake disposed on the upstream side of the continuous regeneration DPF device 13 are controlled in accordance with the control signals output from this engine control unit 30.

Furthermore, wherever necessary, the intake throttle valve (not shown) adjusting the intake quantity into the intake manifold 15 and the EGR valve adjusting the EGR volume and provided together with the EGR cooler on the EGR passage (not shown) etc. are also controlled thereby.

These fuel injection devices 14 are connected to a common-rail fuel injection system (not shown) storing temporarily fuel pressurized by the fuel pump (not shown) to high pressure. In order to drive the engine, the accelerator opening from the accelerator position sensor (APS) 31 and the engine speed from the engine speed sensor 32 etc. are input into the engine control unit 30 together with other data such as the vehicle speed and cooling water temperature, etc.

[Configuration of Control Means]

Figure 2:
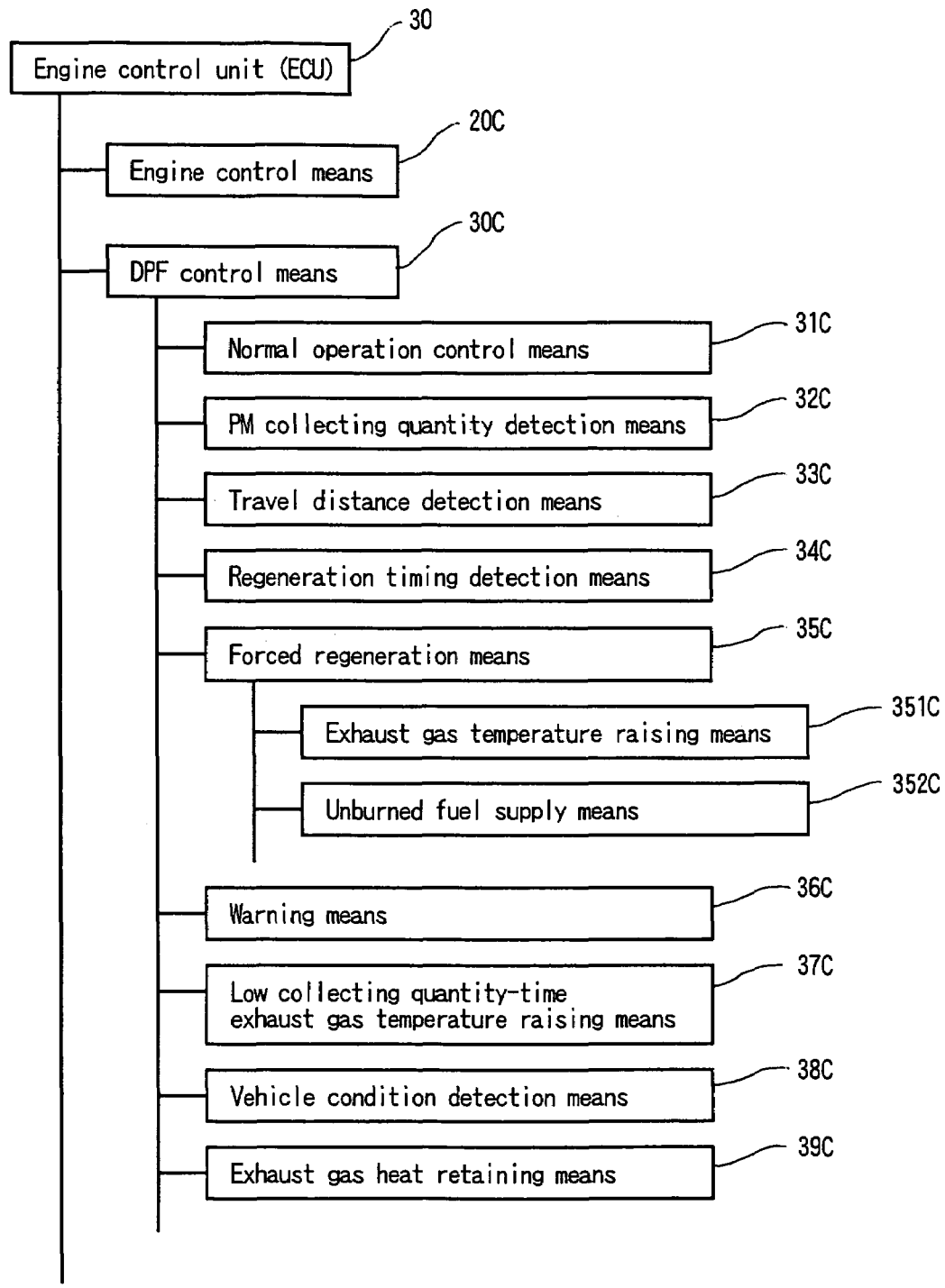
FIG. 2 is a drawing showing the configuration of the control means for the exhaust gas purification system according to an embodiment of the present invention.

As shown in FIG. 2, the control device 30 according to the present invention comprises an engine control means 20C controlling driving of the engine and a DPF control means 30C for the exhaust gas purification system 1 etc. The DPF control means 30C comprises a normal operating control means 31C, a PM collecting quantity detection means 32C, a travel distance detection means 33C, a regeneration timing detection means 34C, a forced regeneration means 35C, a warning means 36C, a low collecting quantity-time exhaust gas temperature raising means 37C, a vehicle condition detection means 38C, and an exhaust gas heat retaining means 39C, etc.

The normal operation control means 31C is in particular a means for performing normal operating unrelated to regeneration of the continuous regeneration DPF device 13.

Normal injection control is carried out wherein a predetermined volume of fuel is injected from the fuel injection devices 14 in accordance with an electric current time signal calculated in the control device 30 based on a signal from the accelerator position sensor 31 and a signal from the engine speed sensor 32.

The PM collecting quantity detection means 32C is a means for detecting the PM collecting quantity ΔPm accumulated in the filter with catalyst 13b of the continuous regeneration DPF device 13. Detection of this collecting quantity ΔPm is carried out using the cumulative calculated value of the collecting quantity estimated from the engine speed and load, the engine rotating accumulated time, and the pressure difference before and after the continuous regeneration DPF device 13 etc. In this embodiment, detection thereof is carried out based on the differential pressure before and after the continuous regeneration DPF device 13—that is, the measurement values from the differential pressure sensor 21.

The travel distance detection means 33C is a means for detecting the travel distance ΔMc traveled by the vehicle after DPF regeneration. Whenever forced regeneration is carried out, this distance ΔMc is reset at a suitable timing from the start of regeneration to the end thereof.

The regeneration timing detection means 34C is a means for detecting the forced regeneration timing for the continuous regeneration DPF device 13 based on comparison of the PM collecting quantity ΔPm detected by the PM collecting quantity detection means 32C and the travel distance ΔMc detected by the travel distance detection means 33C with quantitative judgment quantity set in advance.

Although the control varies slightly in accordance with the type of the continuous regeneration DPF device 13, the forced regeneration means 35C comprises an exhaust gas temperature raising means 351C and an Unburned fuel supply means 352C. The exhaust gas temperature raising means 351C performs multi injection in fuel injection into the cylinder of the engine 10, raising the exhaust gas temperature to the active temperature of the oxidation catalyst 13a. The Unburned fuel supply means 352C performs post injection thereafter, supplying unburned fuel to the exhaust gas. In accordance with these means 351C and 352C, the filter inlet exhaust gas temperature detected by the filter inlet exhaust gas temperature sensor 23 is raised, realizing a suitable temperature and environment for PM oxidation and removal. As a result, the PM accumulated on the filter with catalyst 13b is forcibly burned and removed, and the filter with catalyst 13b is forcibly regenerated. Furthermore, it is also possible to use intake controls by intake throttle and an EGR etc.

The warning means 36C comprises a flashing lamp (or DPF lamp) 41 and a warning lamp 42, etc. This warning means 36C is a means for urging the driver through flashing of the flashing lamp 41 to manually actuate the forced regeneration means 35C, and through the lighting of the warning lamp 42, to bring the vehicle to a service center. Furthermore, upon receiving of this warning, the driver is capable of actuating the forced regeneration means 35C through a manual operation of a regeneration switch 43.

The low collecting quantity-time exhaust gas temperature raising means 37C is configured such that exhaust gas temperature raising is performed by multi injection in the control of fuel injection into the cylinder when the PM collecting quantity ΔPm detected by the PM collecting quantity detection means 32C exceeds a predetermined first temperature raising judgment collecting quantity ΔP01 set lower than a predetermined judgment collecting quantity ΔP1, and following this, when the PM collecting quantity ΔPm detected by the PM collecting quantity detection means 32C becomes lower than a predetermined second temperature raising judgment collecting quantity ΔP02 set lower than the first temperature raising judgment collecting quantity ΔP01, control is performed such that exhaust gas temperature raising by multi injection is stopped.

Furthermore, vehicle condition detection means 38C and an exhaust gas heat retaining means 39C are also provided in the present invention.

This vehicle condition detection means 38C is a means for detecting whether the vehicle is currently in traveling condition or in stationary idling condition. Based on the accelerator opening from the accelerator position sensor 31, the engine speed from the engine speed sensor 32, and the vehicle speed from the car speed sensor (not shown) etc., the vehicle condition detection means 38C judges whether the vehicle is in traveling condition or in stationary idling condition.

Furthermore, the exhaust gas heat retaining means 39C is a means for performing multi injection while throttling the exhaust gas by closing an exhaust throttle value such as an exhaust-brake 16 or an exhaust throttle (not shown) when the vehicle has stopped and shifted to stationary idling condition during exhaust gas temperature raising control. Thereby, the temperature of the exhaust gas can be retained and prevented from dropping.

The DPF control means 30C having the above-described various means is configured as follows. Based on the PM collecting quantity ΔPm detected by the PM collecting quantity detection means 32C and the travel distance ΔMc detected by the travel distance detection means 33C after DPF regeneration, normal operating is continued by the normal operation means 31C, the driver is urged to manually actuate the forced regeneration means 35C, or the forced regeneration means 35C is automatically actuated.

Furthermore, in addition to performing exhaust gas temperature raising by multi injection by the low collecting quantity-time exhaust gas temperature raising means 37C, control is carried out by the exhaust gas heat retaining means 39C such that, when it is detected by the vehicle condition detection means 38C that the vehicle has stopped during the actuation of the low collecting quantity-time exhaust gas temperature raising means 37C, the exhaust throttle valve 16 is closed, and subsequently, when it is again detected by the vehicle condition detection means 38C that the vehicle is traveling, the exhaust throttle valve 16 is opened.

[Regeneration Control]

Hereinafter, a regeneration control by the exhaust gas purification system 1 will be explained. During the course of control by the exhaust gas purification system 1, normal operating is performed by the normal operation means 31C and PM is collected. At suitable time intervals during this normal driving, control is carried out in accordance with the regeneration control flow shown in FIG. 3. Specifically, it is judged whether or not the PM collecting quantity ΔPm detected by the PM collecting quantity detection means 32C and the travel distance ΔMc detected by the travel distance detection means 33C are within a predetermined range, whether manual regeneration is possible, and whether automatic traveling regeneration is possible. Furthermore, whenever so required, following the execution of various processes, the vehicle returns to a normal operating as controlled by the normal operation control means 31C. The driving of the vehicle continues repeating the normal operation control and the regeneration control.

Figure 5:
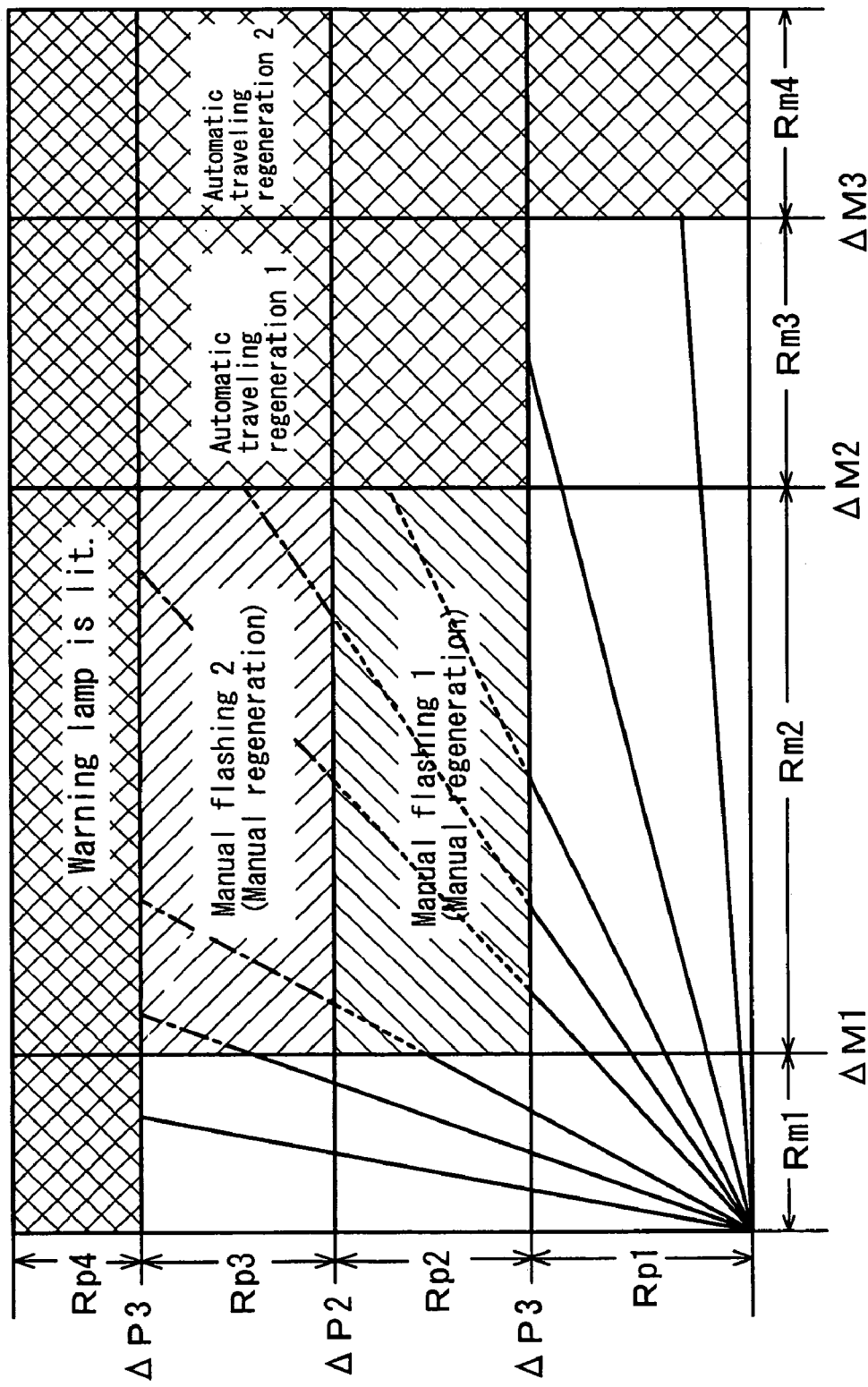
FIG. 5 is a drawing showing in a schematic manner the control map for the regeneration control for the exhaust gas purification system of an embodiment of the present invention.

The regeneration control flow of FIG. 3 will be described with reference to the control map for the regeneration control of FIG. 5. Specifically, the control used to judge whether forced regeneration is required is shown in FIG. 5.

[Regeneration Control Map]

First of all, the control map for the regeneration control of FIG. 5 will be explained. In the control map presented in a schematic fashion in FIG. 5, the vertical axis shows the collecting quantity of PM (or as relevant to this embodiment, the differential pressure) ΔP. Using three thresholds—namely, the first threshold ΔP1 (a predetermined judgment collecting quantity), the second threshold ΔP2, and the third threshold ΔP3—the range of the collecting quantity ΔP is split into four different ranges—namely, the first collecting quantity range Rp1, the second collecting quantity range Rp2, the third collecting quantity range Rp3, and the fourth collecting quantity range Rp4. Furthermore, the horizontal axis thereof shows the travel distance ΔM. Using three thresholds—namely, the first threshold ΔM1, the second threshold ΔM2 (a predetermined first judgment distance), and the third threshold ΔM3 (a predetermined second judgment distance)—the range of the travel distance ΔM is split into four different ranges—namely, the first travel distance range Rm1, the second travel distance range Rm2, the third travel distance range Rm3, and the fourth travel distance range Rm4.

The first threshold ΔM1 indicates the lower limit value at which oil dilution problems do not occur upon manual forced regeneration. The second threshold ΔM2 (a predetermined first judgment distance) indicates the lower limit value at which oil dilution problems do not occur upon automatic forced regeneration during traveling. The third threshold ΔM3 indicates the value at which forced regeneration is carried out to prevent thermal runaway and DPF damage caused by uneven accumulating of PM on the filter with catalyst 13b. Furthermore, the fourth travel distance range Rm4 is the range exceeding the third threshold ΔM3. The forced regeneration and lighting of the warning lamp are automatically carried out at this range Rm4.

Judgment is carried out by regeneration control to judge the range in which the current condition lies, and if so required, the following processing is carried out.

First of all, if forced regeneration is carried out manually when the detected travel distance ΔMc is within the first travel distance range Rm1 and does not exceed the first threshold ΔM1, insufficient evaporation of the fuel within the oil results in the problem of oil dilution. For this reason, manual forced regeneration is prohibited in such a case. Also in this case, the vehicle's traveling pattern can result in the PM collecting quantity per unit distance traveled being high and the detected collecting quantity ΔPm exceeding the third threshold ΔP3 and entering the fourth collecting quantity range Rp4. In such a condition, the PM accumulated on the continuous regeneration-type DPF device 13 begins self-burning, and in order to prevent thermal runaway caused by sudden burning of PM, a state wherein both manual regeneration and automatic traveling regeneration are prohibited is adopted, and furthermore, the warning lamp 42 is lit to urge the driver to bring the vehicle to a service center.

Next, when the detected travel distance ΔMc exceeds the first threshold ΔM1 and enters the second travel distance range Rm2, the travel distance is insufficiently long and evaporation of the fuel mixed into the engine oil does not take place to a sufficient degree; accordingly, automatic forced regeneration is not carried out and a warning is issued to the driver to urge stopping of the vehicle and manual activation of forced regeneration. In this case, different warnings are issued based on the stage of the detected collecting quantity ΔPm.

While the detected collecting quantity ΔPm is smaller than the first threshold ΔP1 (a predetermined judgment collecting quantity), clogging of the filter with catalyst 13b is light and actuation of the regeneration timing detection means 34C is not required; accordingly, normal operation is continued as is. Furthermore, when the detected collecting quantity ΔPm enters the second collecting quantity range Rp2 which exceeds the first threshold ΔP1 (a predetermined judgment collecting quantity) but does not exceed the second threshold ΔP2, automatic traveling regeneration is prohibited in order to prevent the problem of oil dilution during forced regeneration and the flashing lamp (DPF lamp) 41 is flashed slowly (i.e. manual flashing 1) to urge the driver to stop the vehicle and manually perform forced regeneration (manual regeneration).

Furthermore, when the detected collecting quantity ΔPm enters the third collecting quantity range Rp3 which exceeds the second threshold ΔP2 but does not exceed the third threshold ΔP3, automatic traveling regeneration is prohibited in order to prevent the problem of oil dilution during forced regeneration and the flashing lamp 41 is flashed quickly (i.e., manual flashing 2) to strongly urge the driver to stop the vehicle and manually perform forced regeneration. When this third collecting quantity range Rp3 has been entered, certain operation conditions can result in the PM accumulated on the continuous regeneration DPF device 13 beginning to self burn, and in such a case there is a high probability of thermal runaway as a result of sudden PM burning and damage by melting being done to the filter with catalyst 13b; accordingly, the fuel injection volume is also reduced out of concern for the possibility of self burn.

When the detected collecting quantity ΔPm exceeds the third threshold ΔP3 and enters the fourth accumulation range Rp4, the warning lamp 42 is turned on to urge the driver to take the vehicle to a service center in order that neither manual regeneration nor automatic traveling regeneration are activated, preventing thermal runaway.

When the detected travel distance ΔMc exceeds the second threshold ΔM2 (a predetermined first judgment-use driving distance) and enters the third travel distance range Rm3, evaporation of the fuel mixed into the engine oil is sufficient and it is possible to execute automatic forced regeneration (i.e., automatic traveling regeneration) during traveling. Accordingly, when the detected collecting quantity ΔPm exceeds the first threshold ΔP1 (a predetermined judgment collecting quantity) and enters the second travel distance range Rp2, automatic traveling regeneration is carried out during traveling to actuate the regeneration timing detection means 34C automatically. In accordance with this automatic traveling regeneration, the driver is not burdened with the need to activate automatic regeneration, or in other words, to perform On/Off-operation of the manual regeneration switch 43. While the detected collecting quantity ΔPm is smaller than the first threshold ΔP1 (a predetermined judgment collecting quantity), clogging of the filter with catalyst 13b is light and actuation of the regeneration timing detection means 34C is not required. Accordingly, normal operation is continued as is.

When the detected travel distance ΔMc exceeds the third threshold ΔM3 (a predetermined second judgment distance) and enters the fourth travel distance range Rm4, evaporation of the fuel mixed into the engine oil is sufficient and it is possible to execute automatic forced regeneration during traveling. For this reason, while the detected collecting quantity ΔPm does not exceed the third threshold ΔP3, automatic traveling regeneration is carried out without fail and irrespective of the detected collecting quantity ΔPm in order to burn the unevenly accumulated PM. When the detected collecting quantity ΔPm exceeds the third threshold ΔP3 and enters the fourth accumulation range Rp4, a state wherein both manual regeneration and automatic traveling regeneration are prohibited to prevent thermal runaway is adopted, and in addition, the warning lamp 42 is turned on to urge the driver to take the vehicle to a service center.

In other words, as shown in FIG. 5, manual regeneration control execution range (manual flashing 1 and manual flashing 2) is formed in accordance with ΔM1≦ΔMc<ΔM2 (region Rm2) and ΔP1≦ΔPm<ΔP3 (region Rp2 and region Rp3); first automatic traveling regeneration control execution range (automatic traveling regeneration 1) is formed in accordance with ΔM2≦ΔMc<ΔM3 (region Rm3) and ΔP1≦ΔPm<ΔP3 (region Rp2 and region Rp3); and second automatic traveling regeneration control execution range (automatic traveling regeneration 2) is formed in accordance with ΔM3≦ΔMc (region Rm4) and ΔPm<ΔP3 (region Rp1, region Rp2, and region Rp3).

[Regeneration Control Flow]

Figure 3:
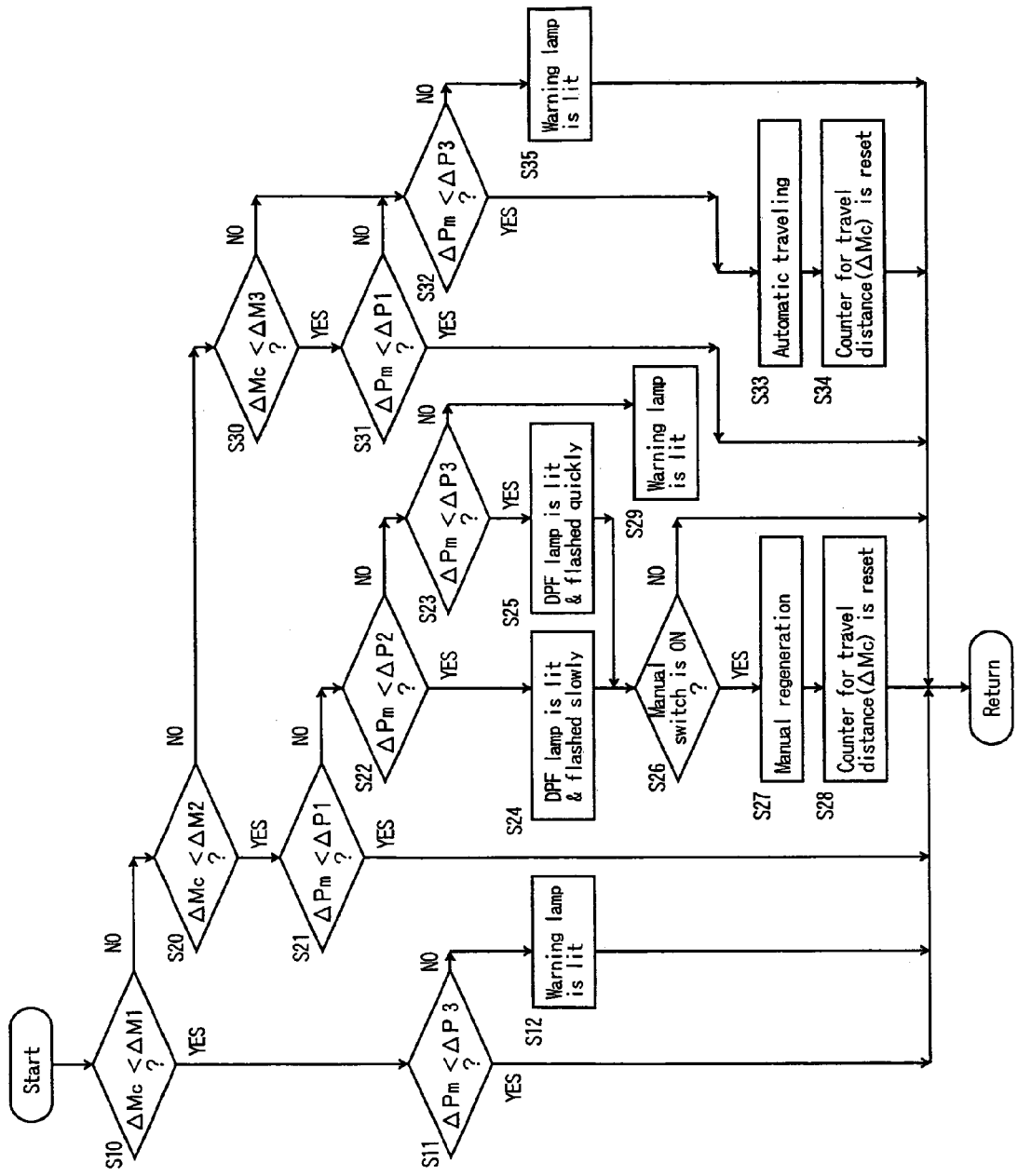
FIG. 3 is a drawing showing the control flow of the regeneration control for the exhaust gas purification system according to an embodiment of the present invention.

The control illustrated in the regeneration control map of FIG. 5 is executed in accordance with the regeneration control flow of which an example is shown in FIG. 3. Upon commencement of the regeneration control flow of FIG. 3, it is judged in Step S10 whether or not the detected travel distance ΔMc is in excess of the first threshold ΔM1 (a predetermined judgment travel distance). If this judgment indicates that the threshold has not been exceeded and ΔMc is in the first travel distance range Rm1, it is judged in Step S11 whether the detected collecting quantity ΔPm is in excess of the third threshold ΔP3, and if this is not the case, control is returned and normal operation continues. Furthermore, if ΔPm is in excess of ΔP3, the warning lamp 42 is lit in Step S12 and control is returned.

Accordingly, if it is judged in Step S10 that the detected travel distance ΔMc is in the first travel distance range Rm1, manual actuation of the regeneration timing detection means 34C is prohibited. Furthermore, automatic actuation of the regeneration timing detection means 34C through automatic traveling regeneration is also not carried out.

If in Step S10 it is judged that the detected travel distance ΔMc is in excess of the first threshold ΔM1 (a predetermined judgment driving distance), in Step S20, it is judged whether the travel distance ΔMc is in excess of the second threshold ΔM2. If this judgment indicates that the threshold has not been exceeded, it is judged in Step S21, whether the collecting quantity ΔPm is in excess of the first threshold ΔP1 (a predetermined judgment collecting quantity), and if this is not the case, control is returned and normal operation is continued.

If in Step S21 it is judged that the collecting quantity ΔPm is in excess of the first threshold ΔP1 (a predetermined judgment collecting quantity), in Step S22, it is judged whether the collecting quantity ΔPm is in excess of the second threshold ΔP2. If this is not the case, the flashing lamp (DPF lamp) 41 is flashed slowly in Step S24, and in Step S26, it is judged whether the manual regeneration switch is On or Off.

Furthermore, if it is judged in Step S22 that the collecting quantity ΔPm is in excess of the second threshold ΔP2, it is judged in Step S23 whether the collecting quantity ΔPm is in excess of the third threshold ΔP3. If this is not the case, the flashing lamp (DPF lamp) 41 is flashed quickly in Step S25, and in Step S26, it is judged whether the manual regeneration switch is On or Off.

If the manual regeneration switch 43 is turned On in Step S26, then as a result of this action, manual regeneration is carried out through actuation of the forced regeneration means 35C. In Step S28, the counter for travel distance ΔMc is reset and control is returned. Furthermore, if the collecting quantity ΔPm is judged based on PM collecting quantity rather than differential pressure, the PM cumulative value is also reset in Step S28. If the manual regeneration switch 43 does not turn On in Step S26, control is returned and switching On of the manual regeneration switch 43 by the driver is awaited during the repetition of this regeneration control flow.

If it is judged in Step S23 that the collecting quantity ΔPm is in excess of the third threshold ΔP3, a state wherein both manual regeneration and automatic traveling regeneration are prohibited is adopted, and in Step S29, the warning lamp 42 is turned on and control is returned.

Furthermore, if it is judged in Step S20 that the travel distance ΔMc is in excess of the second threshold ΔM2, it is judged in Step S30 whether the travel distance ΔMc is in excess of the third threshold ΔM3. If in Step S30 it is judged that this is the case, it is judged in Step S31 whether the collecting quantity ΔPm is in excess of the first threshold ΔP1 (a predetermined judgment collecting quantity). If the judgment of Step S31 judges that this is not the case, control is returned and normal operation continues. Furthermore, the judgment of Step S32 is carried out if in Step S31 it is judged that ΔPm is in excess ΔP1. The judgment of Step S32 is carried out if in Step S30 it is judged that ΔMc is not in excess of the ΔM3.

In Step S32, it is judged whether the collecting quantity ΔPm is in excess of the third threshold ΔP3. If this is the case, a state wherein both manual regeneration and automatic traveling regeneration are prohibited is adopted, and in Step S35, the warning lamp 42 is turned on and control is returned.

Furthermore, if it is judged in Step S32 that the collecting quantity ΔPm is not in excess of the third threshold ΔP3, automatic traveling regeneration is carried out during traveling at Step S33 to actuate the regeneration timing detection means 34C automatically. In Step S34, the counter for travel distance ΔMc is reset and control is returned. Furthermore, if the collecting quantity ΔPm is judged based on PM cumulative value rather than differential pressure, the PM cumulative value is also reset in Step S34.

In other words, in accordance with the regeneration control flow of FIG. 3, even when the collecting quantity ΔPm detected by the PM collecting quantity detection means 32C is detected as exceeding a predetermined judgment collecting quantity ΔP1 (first threshold), if the travel distance ΔMc after the start of accumulation detected by the travel distance detection means 33C has not yet reached a predetermined judgment travel distance ΔM1 (first threshold), no warning is issued using the warning means 36C, and control is carried out such that actuation of the forced regeneration means 35C by the driver is prohibited.

Furthermore, if the travel distance ΔMc after the start of accumulation detected by the travel distance detection means 33C has reached a predetermined judgment travel distance ΔM1 (first threshold) but not reached the second threshold ΔM2 and the collecting quantity ΔPm detected by the PM collecting quantity detection means 32C is detected as exceeding a predetermined judgment collecting quantity ΔP1 (first threshold), the flashing lamp (DPF lamp) 41 is slowly flashed and the driver is urged to manually operate the manual regeneration switch 43. When this flashing lamp 41 flashes, the driver must promptly stop the vehicle and manually activate forced regeneration using the manual regeneration switch 43. However, if this warning is ignored, PM will continue to accumulate on the filter with catalyst 13b, and when the detected collecting quantity ΔPm exceeds a predetermined second threshold ΔP2, the flashing lamp 41 is flashed quickly, providing a more explicit warning to the driver and strongly urging that manual regeneration be carried out.

[Regeneration Control Flow for Low Collecting Quantity-time Exhaust Gas Temperature Raising Means]

Figure 4:
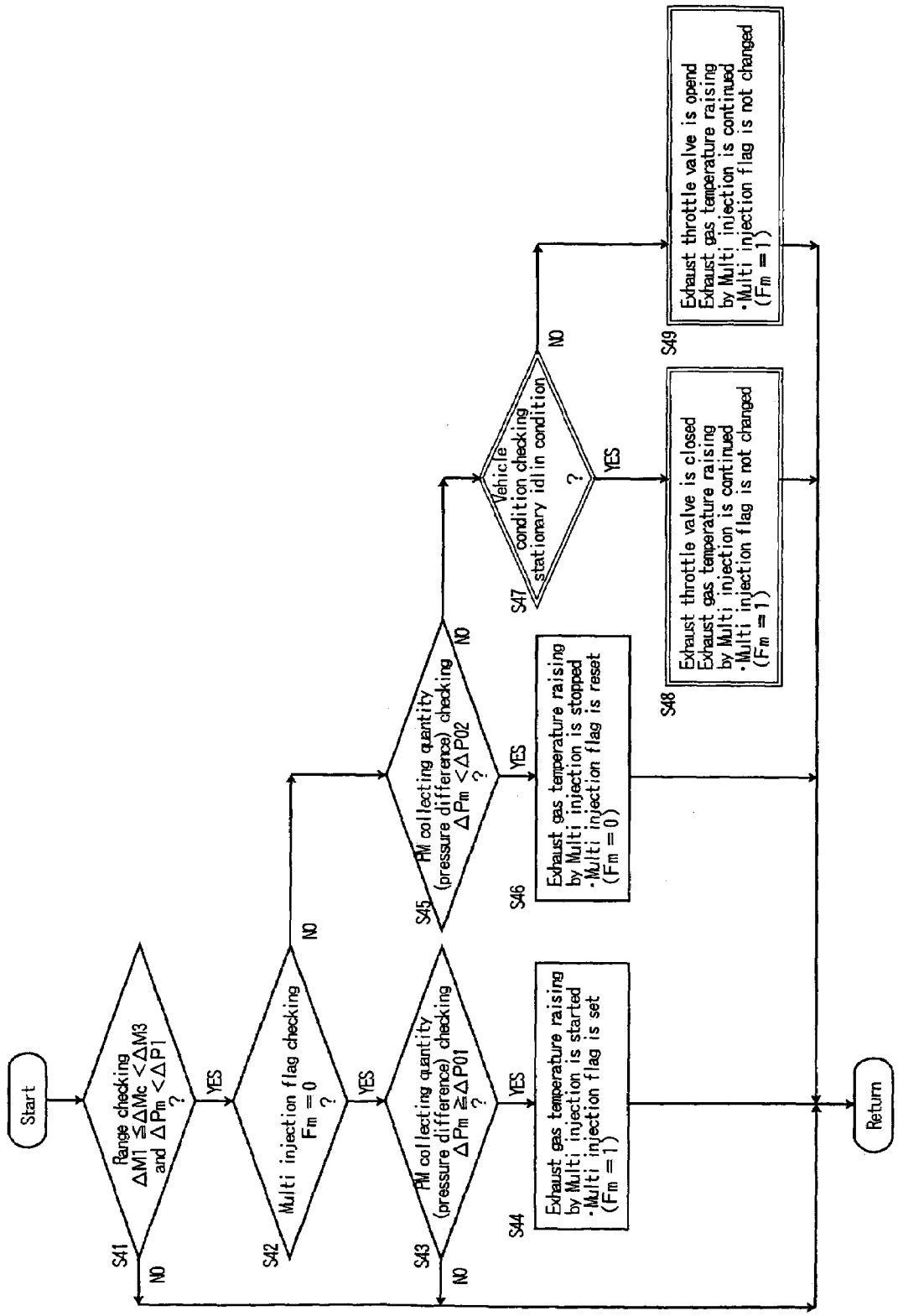
FIG. 4 is a drawing showing the control flow of the low collecting quantity-time exhaust gas temperature raising control according to the present invention.
Figure 6:
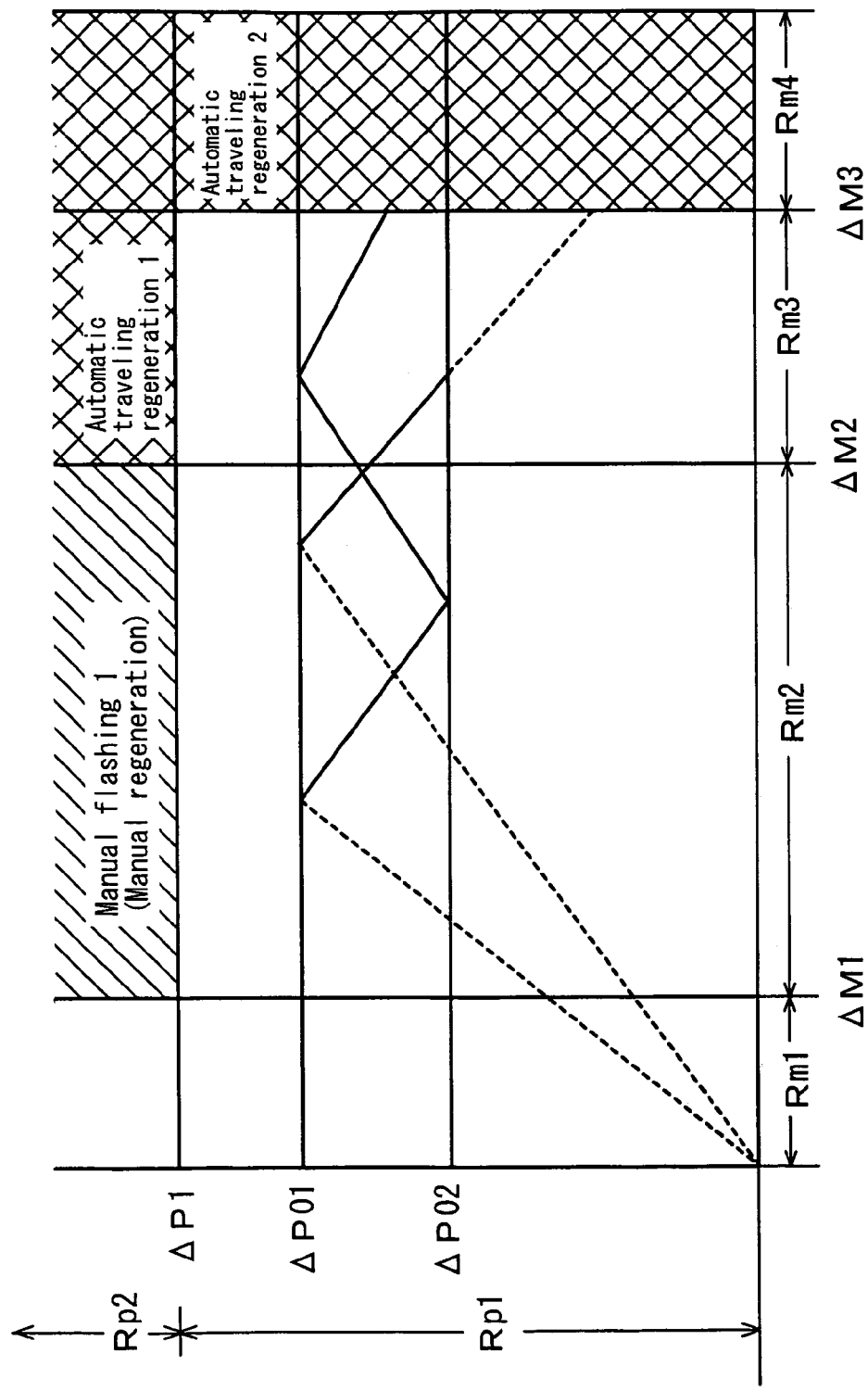
FIG. 6 is a drawing showing in a schematic manner the control map for the low collecting quantity-time exhaust gas temperature raising control according to the present invention.

In addition to the above-described DPF regeneration control and in accordance with the control flow of FIG. 4, the present invention discloses exhaust gas temperature raising by the low collecting quantity-time exhaust gas temperature raising means 37C in combination with the exhaust gas temperature heat retaining control by the exhaust gas temperature heat retaining means 39C. Furthermore, FIG. 6 shows an example of a control map according to the control flow of FIG. 4.

The control flow of FIG. 4 is a control flow called and executed before the control flow of FIG. 3 is called and executed, and when started, range checking is carried out in Step S41. In this range check, it is judged whether the travel distance ΔMc is in excess of the first threshold ΔM1 and not in excess of the third threshold ΔM3, and also whether the collecting quantity ΔPm is less than the first threshold ΔP1. If this condition is not satisfied, control is returned without carrying out exhaust gas temperature raising.

In other words, exhaust gas temperature raising is performed in this control flow only when the travel distance is in the second travel distance range Rm2 or the third travel distance range Rm3, and in addition, the collecting quantity range is in the first collecting quantity range Rp1; furthermore, in the case of all other ranges, exhaust gas temperature raising is not carried out in this control flow.

If the condition of Step S41 is satisfied, it is judged in Step S42 whether exhaust gas temperature raising by multi injection is being carried out at the corresponding point in time based on the multi injection flag Fm being 0 (zero, flag off) or 1 (one, flag on). If in this judgment the multi injection flag Fm is 0, it is judged that exhaust gas temperature raising by multi injection is not being carried out, and control proceeds to Step S43. If in this judgment the multi injection flag Fm is 1, it is judged that exhaust gas temperature raising by multi injection is being carried out, and control proceeds to Step S45.

In Step S43, it is judged whether the PM collecting quantity ΔPm (i.e., differential pressure) equal to or greater than—that is, in excess of—a fourth threshold ΔP01 (a predetermined first temperature raising judgment collecting quantity) set lower than the first threshold (a predetermined judgment collecting quantity) ΔP1. If this is not the case, control returns without performing exhaust gas temperature raising; alternatively, if ΔPm is in excess of ΔP01, control proceeds to Step S44, and exhaust gas temperature raising is started by multi injection resulting from control of fuel injection into the cylinder by the low collecting quantity-time exhaust gas temperature raising means 37C. This exhaust gas temperature raising is carried out over the predetermined period of time corresponding to the check interval for PM collecting quantity, the multi injection flag is set (i.e., Fm=1), and control is returned.

In Step S45, it is judged whether the PM collecting quantity ΔPm (i.e., differential pressure) is less than a fifth threshold ΔP02 (a predetermined second temperature raising judgment collecting quantity) set lower than the fourth threshold ΔP01. If this is the case, exhaust gas temperature raising by multi injection as a result of operation of the low collecting quantity-time exhaust gas temperature raising means 37C is stopped in Step S46, and in addition to stopping the low collecting quantity-time exhaust gas temperature raising means 37C, the multi injection flag is reset (i.e., Fm=0) and control is returned.

Furthermore, if ΔPm is detected as being not less than ΔP02 in Step S45, control proceeds to Step S47, a vehicle condition check is carried out by the vehicle condition detection means 38C, and if the state is identified as being stationary idling condition, exhaust gas temperature heat retaining control is performed in Step S48 by the exhaust gas temperature heat retaining means 39C. In other words, in addition to closing the exhaust throttle valve 16, exhaust gas temperature raising by multi injection resulting from operation of the low collecting quantity-time exhaust gas temperature raising means 37C is continued. This exhaust gas temperature heat retaining control is carried out over the predetermined period of time corresponding to the check interval for vehicle condition, and control is subsequently returned. At this time, the multi injection flag (Fm=1) is not changed.

Furthermore, the vehicle condition check of Step S47 is carried out, and if not in stationary idling condition but in the driving state, in addition to opening the exhaust throttle valve 16 in Step S49, exhaust gas temperature raising by multi injection resulting from operation of the low collecting quantity-time exhaust gas temperature raising means 37C is continued. This exhaust gas temperature raising control is carried out over the predetermined period of time corresponding to the check interval for vehicle condition, and control is subsequently returned. At this time, the multi injection flag (Fm=1) is not changed.

When the control flow of FIG. 4 is completed and control is returned, the control flow of FIG. 3 is executed, and upon any transition between the driving distance ranges Rm1, Rm2, Rm3, and Rm4 and the collecting quantity ranges Rp1, Rp2, Rp3, and Rp4 occurs, the corresponding control is carried out. Furthermore, if no such range transition occurs, the control flow of FIG. 4 is restarted. In this way, the control flow of FIG. 4 and the control flow of FIG. 3 are repeated in sequence.

In accordance with the above-described control, when the collecting quantity ΔPm (differential pressure) detected by the PM collecting quantity detection means 32C exceeds a predetermined first temperature raising judgment collecting quantity ΔP01 (fourth threshold) set lower than a predetermined judgment collecting quantity ΔP1 (first threshold), exhaust gas temperature raising by multi injection is executed, and following this, when the collecting quantity ΔPm becomes lower than a predetermined second temperature raising judgment collecting quantity ΔP02 (fifth threshold) set lower than the first temperature raising judgment collecting quantity ΔP01 (fourth threshold), control is performed such that exhaust gas temperature raising by multi injection is stopped.

In other words, from the point at which the collecting quantity ΔPm exceeds the predetermined first temperature raising judgment collecting quantity ΔP01 to the point at which the collecting quantity ΔPm becomes lower than the predetermined second temperature raising judgment collecting quantity ΔP02, exhaust gas temperature raising by multi injection is carried out; accordingly, the temperature of the exhaust gas is raised, PM is burned, and regeneration of the DPF is advanced.

For this reason, the frequency with which the collecting quantity reaches the predetermined judgment collecting quantity requiring manual regeneration reduces, and consequently, the frequency of manual regeneration through operation of the manual regeneration switch is markedly reduced, improving ease of operation for the driver.

In addition, if the vehicle condition detection means 38C detects stopping of the vehicle during operation of the low collecting quantity-time exhaust gas temperature raising means 37C, the exhaust throttle valve 16 is closed as operation of the low collecting quantity-time exhaust gas temperature raising means 37C continues; and following this, if the vehicle condition detection means 38C again detects the vehicle's traveling state and the exhaust throttle valve 16 is opened, allowing operation of the low collecting quantity-time exhaust gas temperature raising means 37C to continue.

In other words, if the vehicle stops at traffic signals etc. while performing low collecting quantity-time exhaust gas temperature raising by multi injection not related to forced regeneration, in addition to continuing multi injection, it is also possible to increase the engine load by exhaust gas throttling control achieved by closing an exhaust gas brake 16 or exhaust throttle. Accordingly, the exhaust gas can be maintained at a high temperature, and even when driving is restarted, DPF self-regeneration can proceed efficiently.

Consequently, reliable burning of PM is possible even for driving patterns featuring frequent waiting at traffic signals in urban areas, and the frequency at which the collecting quantity $\Delta Pm$ reaches the predetermined judgment collecting quantity requiring manual regeneration $\Delta P1$ can be reduced. For this reason, the frequency of manual regeneration request can be drastically reduced and the driver's ease of operation can be increased.

The above explanation deals with the example of a continuous regeneration-type DPF device in the exhaust gas purification system realized as a continuous regeneration-type DPF device providing an oxidation catalyst on the upstream side of the filter while also making a catalyst supported on the filter; however, the present invention is not restricted to this embodiment. Furthermore, the continuous regeneration-type DPF device may also be of the type making an oxidation catalyst supported on the filter or providing an oxidation catalyst on the upstream side of the filter, etc.

The invention claimed is:

1. A control method for an exhaust gas purifying system, in an internal combustion engine mounted on a vehicle provided with a continuous regeneration DPF device and an exhaust throttle valve in the exhaust gas passage thereof; having a DPF control means including;
   a collected quantity detection means for detecting the quantity of collected matters in the continuous regeneration DPF device,
   a travel distance detection means for detecting the travel distance of the vehicle,
   a regeneration timing judgment means for judging the regeneration start timing of the continuous regeneration DPF device,
   an exhaust gas temperature raising means for raising the exhaust gas temperature,
   an unburned fuel supply means for supplying unburned fuel in the exhaust gas,
   a forced regeneration means for regenerating the continuous regeneration DPF device by raising the exhaust gas temperature and forcibly burning the collected matters using the exhaust gas temperature raising means and the unburned fuel supply means,
   a warning means providing a warning urging a driver to stop the vehicle and operate the forced regeneration means, and
   a low collecting quantity-time exhaust gas temperature raising means for raising the exhaust gas temperature through control of fuel injection into the cylinder without Unburned fuel supply control;
   said DPF control means actuating the warning means within a manual regeneration control execution range in which the travel distance detected by the travel distance detection means is not more than a predetermined first judgment travel distance, and in addition, the quantity of collected matters detected by the PM collecting quantity detection means exceeds a predetermined judgment collecting quantity necessary for regeneration;
   automatically executing the forced regeneration means during traveling of the vehicle in both a first automatic traveling regeneration execution range in which a detected travel distance exceeds the predetermined first judgment travel distance and the detected quantity of collected matters exceeds the predetermined judgment collecting quantity, and a second automatic traveling regeneration execution range in which the detected travel distance exceeds a predetermined second judgment travel distance set higher than the predetermined first judgment travel distance;
   and actuating the low collecting quantity-time exhaust gas temperature raising means when the detected travel distance is less than the predetermined second judgment travel distance and the detected quantity of collected matters exceeds a predetermined first judgment quantity of collected matters set lower than the predetermined judgment collecting quantity, and subsequently suspending the actuation of the low collecting quantity-time exhaust gas temperature raising means when the detected quantity of collected matters is less than a predetermined second judgment quantity of collected matters set lower than the predetermined first judgment quantity of collected matters;
   wherein said DPF control means is provided with a vehicle condition detection means for detecting the stationary condition and the traveling condition of the vehicle;
   and continues the actuation of the low collecting quantity-time exhaust gas temperature raising means to close the exhaust throttle valve upon detection of stopping of the vehicle by the vehicle condition detection means during usage of the low collecting quantity-time exhaust gas temperature raising means, subsequently opens the exhaust throttle valve upon re-detection of the vehicle's traveling condition using the vehicle condition detection means, and continues the actuation of the low collecting quantity-time exhaust gas temperature raising means.

2. An exhaust gas purifying system, in an internal combustion engine mounted on a vehicle provided with a continuous regeneration DPF device and an exhaust throttle valve in the exhaust gas passage thereof, having a DPF control means including;
   a collected quantity detection means for detecting the quantity of collected matters in the continuous regeneration DPF device,
   a travel distance detection means for detecting the travel distance of the vehicle, a regeneration timing judgment means for judging the regeneration start timing of the continuous regeneration DPF device, an exhaust gas temperature raising means for raising the exhaust gas temperature, an unburned fuel supply means for supplying unburned fuel in the exhaust gas, a forced regeneration means for regenerating the continuous regeneration DPF device by raising the exhaust gas temperature and forcibly burning the collected matters using the exhaust gas temperature raising means and the unburned fuel supply means, a warning means providing a warning urging a driver to stop the vehicle and actuate the forced regeneration means, and a low collecting quantity-time exhaust gas temperature raising means for raising the exhaust gas temperature through control of fuel injection into the cylinder without Unburned fuel supply control;

said DPF control means actuating the warning means within a manual regeneration control execution range in which the travel distance detected by the travel distance detection means is not more than a predetermined first judgment travel distance, and in addition, the quantity of collected matters detected by the PM collecting quantity detection means exceeds a predetermined judgment collecting quantity necessary for regeneration;

automatically executing the forced regeneration means during traveling of the vehicle in both a first automatic traveling regeneration execution range in which a detected travel distance exceeds the predetermined first judgment travel distance and the detected quantity of collected matters exceeds the predetermined judgment collecting quantity, and a second automatic traveling regeneration execution range in which the detected travel distance exceeds a predetermined second judgment travel distance set higher than the predetermined first judgment travel distance; and actuating the low collecting quantity-time exhaust gas temperature raising means when the detected travel distance is less than the predetermined second judgment travel distance and the detected quantity of collected matters exceeds a predetermined first judgment quantity of collected matters set lower than the predetermined judgment collecting quantity, and subsequently suspending the actuation of the low collecting quantity-time exhaust gas temperature raising means when the detected quantity of collected matters is less than a predetermined second judgment quantity of collected matters set lower than the predetermined first judgment quantity of collected matters;

wherein said DPF control means is provided with a vehicle condition detection means for detecting the stationary condition and traveling condition of the vehicle;

and closes the exhaust throttle valve upon detection of stopping of the vehicle using the vehicle condition detection means during actuation of the low collecting quantity-time exhaust gas temperature raising means, and subsequently opens the exhaust throttle valve upon re-detection of the vehicle's traveling condition using the vehicle condition detection means, and continues the actuation of the low collecting quantity-time exhaust gas temperature raising means.

3. The exhaust gas purifying system of claim 2, further characterized in that the exhaust throttle valve is an exhaust brake valve disposed on the upstream side of said continuous regeneration DPF device.

4. The exhaust gas purifying system of claim 2, further characterized in that said continuous regeneration DPF device is one of a continuous regeneration DPF device supporting an oxidation catalyst on the filter, a continuous regeneration DPF device providing an oxidation catalyst on the upstream side of the filter, and a continuous regeneration DPF device providing an oxidation catalyst on the upstream side of a filter and supporting catalyst on the filter, or a combination thereof.

5. The exhaust gas purifying system of claim 3, further characterized in that said continuous regeneration DPF device is one of a continuous regeneration DPF device supporting an oxidation catalyst on the filter, a continuous regeneration DPF device providing an oxidation catalyst on the upstream side of the filter, and a continuous regeneration DPF device providing an oxidation catalyst on the upstream side of a filter and supporting catalyst on the filter, or a combination thereof.

* * * * *